United States Patent [19]

Cha

[11] Patent Number: 5,129,047

[45] Date of Patent: Jul. 7, 1992

[54] CIRCUIT FOR CONTROLLING THE PRINTING POSITION OF A VIDEO PRINTER AND METHOD THEREFOR

[75] Inventor: Dong-Il Cha, Suwon, Rep. of Korea

[73] Assignee: Samsung Electronics Co., Ltd., Suweon, Rep. of Korea

[21] Appl. No.: 524,885

[22] Filed: May 18, 1990

[30] Foreign Application Priority Data

May 19, 1989 [KR] Rep. of Korea ............... 1989-6719

[51] Int. Cl.$^5$ .................................. G06K 00/15
[52] U.S. Cl. ...................... 395/105; 395/101
[58] Field of Search ................. 364/518–520, 364/235 MS, 430 MS; 346/76 PH, 154, 157; 355/317; 358/75; 395/105, 107, 101, 112

[56] References Cited

U.S. PATENT DOCUMENTS

| | | | |
|---|---|---|---|
| 4,468,693 | 8/1984 | Fujita et al. | 395/105 |
| 4,517,591 | 5/1985 | Nagashima et al. | 346/76 PH |
| 4,705,386 | 11/1987 | Ogita et al. | 395/105 |
| 4,990,930 | 2/1981 | Ludden | 346/76 PH |

*Primary Examiner*—Arthur G. Evans
*Attorney, Agent, or Firm*—Robert E. Bushnell

[57] ABSTRACT

A video printer for sequentially printing the video signals of a video processing system on a paper in full colors is disclosed, which includes a sensor for sensing printing paper, an amplifier for amplifying the output of said sensor, a microcomputer for generating a control signal to temporarily stop or to drive, at the normal speed or at two times the normal speed, a motor according to the output of said amplifier, a control circuit for controlling the motor to conform the initialization of the position of multi-color printing according to the control signal of said microcomputer and the sensing signal of said sensor, and a motor driver for driving said motor according to the control signal of said microcomputer.

20 Claims, 4 Drawing Sheets

CIRCUIT FOR CONTROLLING THE PRINTING POSITION OF A VIDEO PRINTER AND METHOD THEREFOR

BACKGROUND OF THE INVENTION

The present invention relates to a method for controlling the printing position of a video printer, whereby the initial position of printing paper is precisely controlled to prevent misplacement of the printing paper and thus deterioration of the picture quality.

Generally, the video printer employs a ribbon having three dyestuffs of yellow (Y), magenta (M) and cyan (C) which are sequentially sublimated by the heat of a thermal head and deposited on a single printing paper which is to circulate three times so as to print a video signal thereon with full colors. In this case, the amount of the generated heat by the thermal head is precisely controlled so as to regulate the amount of each of the dyestuffs subliminated, thereby freely making intermediate colors (color gradation).

Such conventional video printer as is shown in FIG. 1A includes a thermal head 100, a color ribbon 102, and a paten drum 106. The color ribbon 102 includes three colors of Y, M, C, which are bounded by a black strip with adjacent three colors, as is shown in FIG. 1B.

A printing paper 104 in close contact with the platen drum 106 runs between the platen drum 106 and the color ribbon 102 beneath the thermal head 100 at the same speed as the platen drum 106. The thermal head 100 heat generates according to the input video signals to sublimate each of the dyestuffs on the color ribbon 102, so that the sublimated dyestuffs are deposited on the printing paper 104, thereby reproducing the original colors of the input video signals. In order to fully reproduce the colors of the input video signal, whenever the printing paper 104 passes the theraml head 100, the position of the printing paper relative to the thermal head must always be the same, so that the dyestuffs of Y, M, C are sequentially deposited on the same spot with respect to each picture element. Here, the platen drum 106 circulates three times (one i.e., time for each of the three components Y, M, C) in order to complete one picture sheet.

Therefore, it is very important to precisely adjust the initial printing position of the thermal head 100, and if the initial printing position is misplaced, the printing spot with respect to each picture element is misplaced so as to separate the three color elements from each other, thus causing deterioration of the picture quality and forming a strip of M or C color along both sides of the printed picture as is shown in FIG. 3.

In such a conventional video printer, a circuit for sensing and controlling the position of the printing paper is constructed as shown in FIG. 2. The signal that is produced by photo-coupler 108 to sense the entrance of the printing paper 104 is amplified by amplifier 112, and is applied to microcomputer 114 to control the speed of the platen drum 106 according to the signal. For example, in order to reduce the printing time of the video signal, the platen drum is rotated at the normal speed when printing, while rotating at two times the normal speed when not printing.

If the time that is taken from the moment of the photo-coupler sensing the printing paper for the moment of the signal processing of amplifier 112 and microcomputer 114 to the normal speed of the motor 120 is different for each of the Y, M, C components, or the rotation of the motor 120 is affected by the backlash of gear 122, etc., the initial printing position is misplaced.

Thus, the speed control error of the motor 120 results when the signal sensed by the photo-coupler 108 is applied to the microcomputer 114, such that there occur differences of the sensing response time according to the moment when the program counter of the microcomputer 114 makes the sensing determination (present counting).

Consequently, if the initial printing position is misplaced, the printing position of the Y, M, C comonents is misplaced on the printing paper by a gap "a" or "b" as shown in FIG. 3, so that the picture quality is deteriorated throughout.

SUMMARY OF THE INVENTION

It is therefore, an object of the present invention to provide an improved circuit and method for controlling the position of printing on print media.

It is another object to provide a circuit and method for precisely controlling the initial position of the printing paper by equalizing for each revolution of the platen drum the time that is taken from the moment of sensing the printing paper until the speed of the platen drum reaches the normal speed under the control of a microcomputer.

According to an aspect of the present invention, a video printer for sequentially printing the video signals of a video processing system on a paper in full colors includes a sensor for sensing printing paper; an amplifier for amplifying the output of the sensor; a microcomputer for generating a control signal to temporarily stop or to drive at either the normal speed or two times the normal speed, a motor according to the receiving of the output of the amplifier; a control circuit for controlling the motor to conform to the initialization of the position of multi-color printing according to the control signal of the microcomputer and the sensing signal of the sensor; and a driver for driving the motor according to the control signal of the microcomputer.

The present invention will now be described more specifically with reference to the drawings attached only by way of example.

BRIEF DESCRIPTION OF THE DRAWINGS

For a better understanding of the invention and to show how the smae may be carried into effect, reference will now be made, by way of example, to the accompanying diagrammatic drawings, in which.

DETAILED DESCRIPTION OF THE PREFERRED EMBODIMENT

Figure 1B:
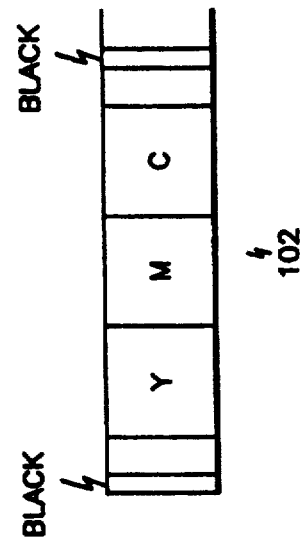
FIG. 1A & 1B are cross-sectional views for illustrating the essential part of a conventional apparatus for printing a video signal.
Figure 1A:
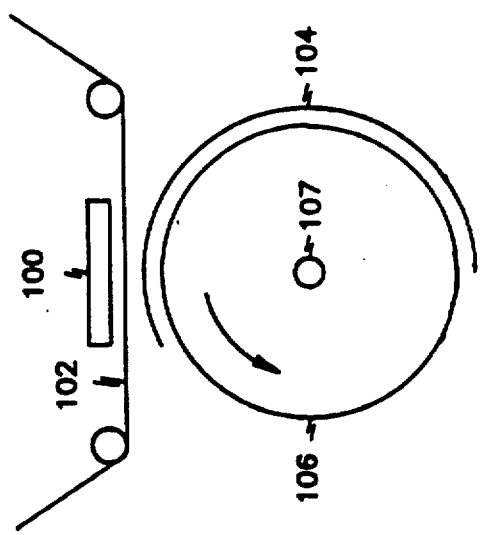
Figure 2:
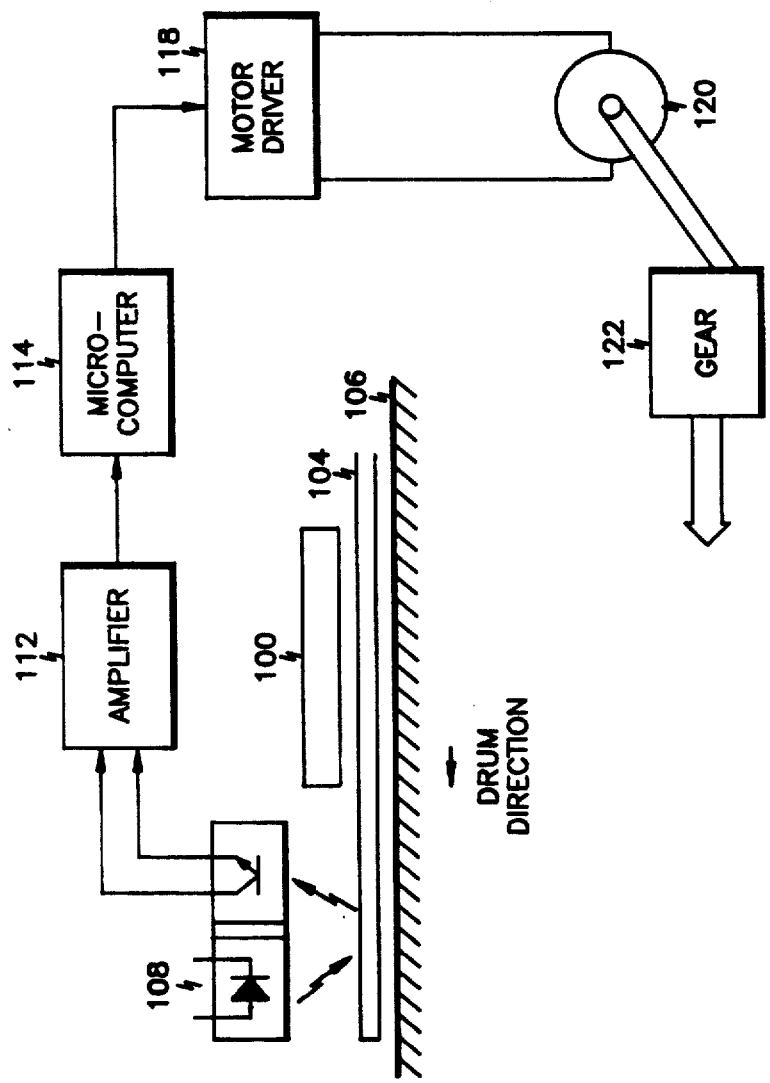
FIG. 2 is a block diagram of a conventional circuit for controlling the printing position of a video signal.
Figure 3:
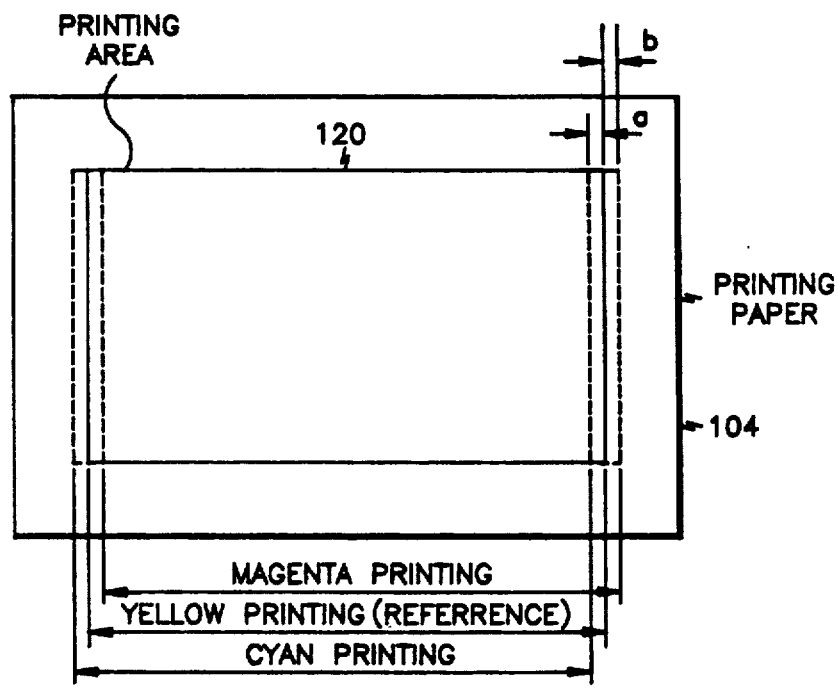
FIG. 3 is an example of a picture printed by a conventional video printer.
Figure 4:
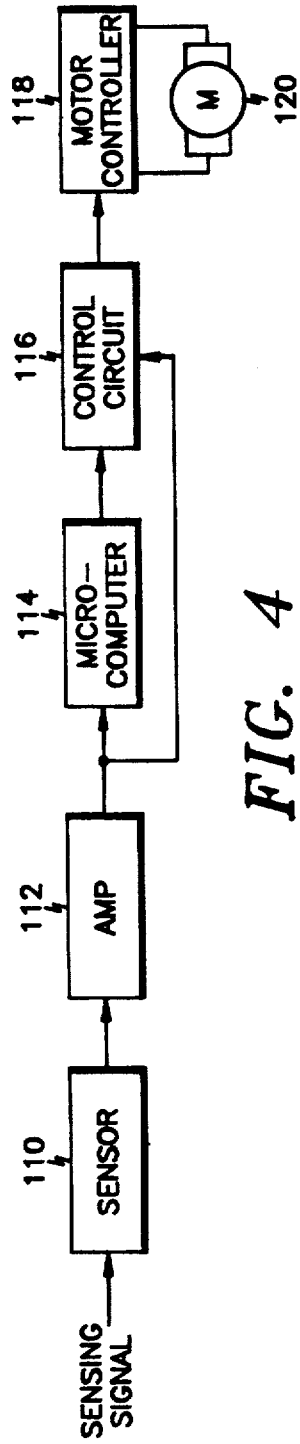
FIG. 4 is a block diagram for illustrating a circuit for controlling the printing position of a video printer according to the present invention.

Referring to FIG. 4, sensor 110 senses the printing paper 104 passing between platen drum 106 and thermal head 100, providing the output thereof to amplifier 112 which amplifies and delivers it to microcomputer 114 and control circuit 116. The microcomputer 114 supplies a control signal to the control circuit 116 that controls the power supply to motor driver 118, so as to properly control the speed of the motor 120, thereby initializing the printing position of a video signal of the Y, M, C components on the printing paper.

Figure 5:
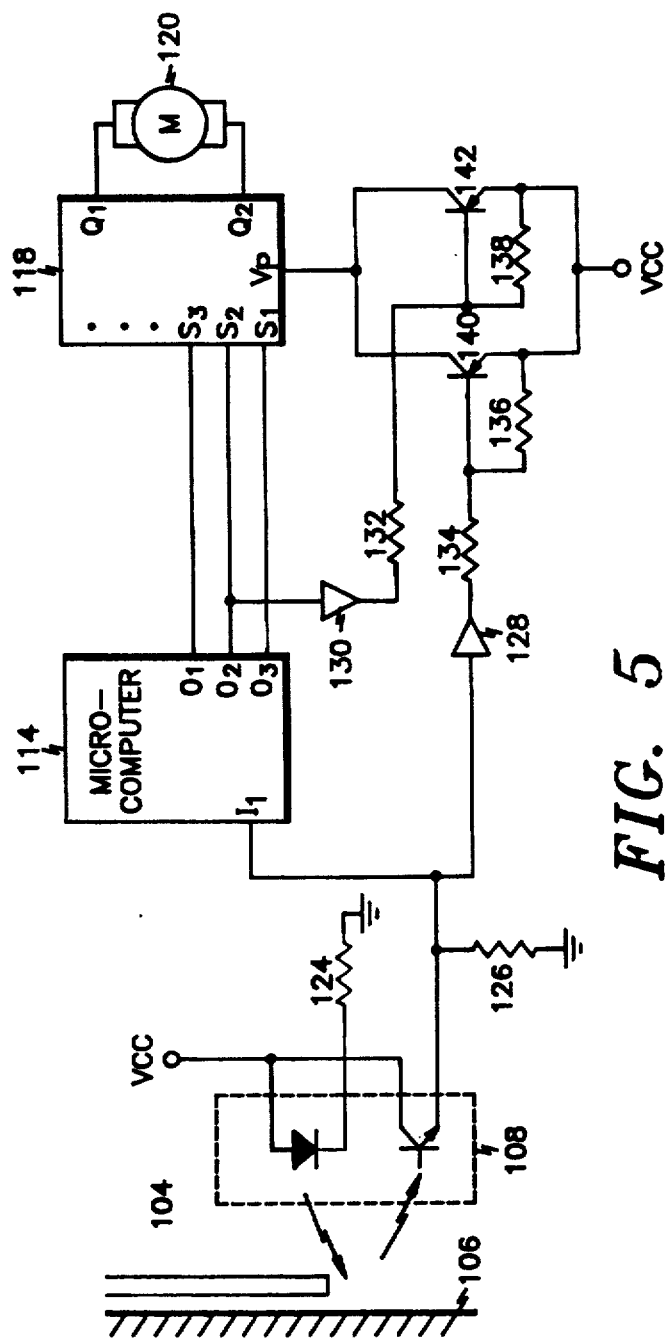
FIG. 5 is a detailed diagram for illustrating a circuit for controlling the printing position of a video printer according to one embodiment of the present invention.

Referring to FIG. 5, photo-coupler 108 includes light-emitting diode and photo-transistor respectively having current-limiting resistors 124 and 126 connected to the ground. The output of the photo-transistor is delivered through its emitter to interrupt terminal $T_1$ of the microcomputer 114 and first buffer 128, while the signals of the output terminals $O_1$, $O_2$, $O_3$ of the microcomputer 114 are applied to the selecting terminals $S_1$, $S_2$, $S_3$ of the motor driver 118 (preferably, it may be a single chip designated as M54548L). The first and second outputs $Q_1$, $Q_2$ of the motor driver 118 are connected to the motor 120. The power supply terminal VP of the motor driver 118 is commonly connected to the collectors of first and second transistors 140, 142 whose emitters are commonly connected to the power supply Vcc. The base of the first transistor 140 is connected through a resistor 134 to first buffer 128, while the base of the second transistor 142 is connected through a resistor 132 to second buffer 130. The input of the second buffer 130 is connected to the second output $O_2$ of the microcomputer 114.

In the drawing, if the photo-transistor of the photo-coupler 108 does not sense the printing paper, the photo-transistor is turned off, cutting off the power supply applied to the photo-coupler 108. Hence, the base of the first transistor 140 has the voltage level of low state, thereby causing the first transistor 140 to conduct. At this time, the second transistor 142 is turned off by the second output signal generated according to the sensing signal from the microcomputer 114, which at the same time outputs a control signal representing two times the normal speed of the motor. Conversely, if the photo-coupler 108 senses the printing power, the first and second transistors 140 and 142 are simultaneously turned off so as to temporarily stop the motor 120. Thereafter, if the sensing signal applied to the microcomputer 114 causes the first to third output terminals to generate the signals for rotating the motor 120 at the normal speed, the second transistor 142 simultaneously conducts to rotate the motor 120 at the normal speed, thus performing the printing process of a video signal. The revolution speed of the motor 120 according to the states of the selecting terminals $S_1$-$S_3$ of the motor driver is shown in the following Table 1.

TABLE 1

|  | $S_1$ | $S_2$ | $S_3$ |
|---|---|---|---|
| Normal Speed | L | L | H |
| Two Times the Normal Speed | L | H | L |

As described above, at the moment when the photo-coupler senses the printing paper, the motor is temporarily stopped, and at the moment when the program executed by the microcomputer responds to the sensing, the speed change of the motor and heat generation by the thermal head occur, so that the initial printing position is precisely controlled during the revolutions of printing for the three Y, M, C components, thus improving the printing quality of a video printer according to the present invention.

Motor driver 118 (a single chip, M54548L) produces the motor driving outputs selectively for the "normal speed" or for the "two times the normal speed", responsively to the control signals applied to the selection terminals $S_1$, $S_2$, $S_3$ thereof. Therefore, as described in Table 1, in order to rotate the motor at normal speed, the logic states of the control signal applied to the selection terminals $S_1$, $S_2$, $S_3$, must be respectively Low, Low and High (L-L-H); the "two times the normal speed" rotation, the logic states must be respectively Low, High and Low (L-H-L).

When photo-coupler 108 can not sense the entry of printing paper, the system rotates motor 120 at two times the normal speed so as to save printing time. That is, if the entry of a printing paper is not sensed, the transistor of photo-coupler 108 is turned OFF, and thus transistor 140 is turned ON because, at this moment, the output of buffer 128 is at a logic low state. At the same moment, microcomputer 114 generates the logic states L-H-L through the respective output terminals $O_1$-$O_2$-$O_3$ in response to the logic low signal of the interrupt terminal $I_1$. At the base of transistor 142, a logic high voltage is applied, and thus transistor 142 is turned off. Therefore, in this case, motor driver 118 can be provided with power through transistor 140.

Meanwhile, if the photo-coupler 108 senses the entry of the printing paper, the base of transistor 140 and the interrupt terminal $I_1$ of microcomputer 114 are provided with power supply Vcc by way of the transistor of photo-coupler 108. However, since it takes a while for the microcomputer 114 to program, the previous logic states L-H-L are held for a predetermined interval. Therefore, at this moment, the two transistors 140, 142 are simultaneously turned off so as to cut of the power supply provided to motor driver 118. As s result, the motor stops running.

Therefore, if microcomputer 114 terminates counting the program and changes the logic states to L-L-H for the normal speed driving, transistor 142 is turned on because the output state $O_2$ is at logic low level. Accordingly, motor driver 118 can be provided with power supply Vcc by way of transistor 142.

It may be seen therefore, that transistors 140 and 142 for controlling the power supply provided to motor driver 118 and the rotation speed of the motor is dependent upon the control signal applied to the selection terminals $S_1$, $S_2$, $S_3$.

While the invention has been particularly shown and described with reference to a preferred embodiment, it will be understood by those skilled in the art that modifications in detail may be made without departing from the spirit and scope of the invention.

I claim:

1. In a video printer for sequentially printing video signals from a video signal processing system on a printing medium in full color, an apparatus for controlling the printing position of the video printer, comprising:
   means for sensing a printing medium and for providing a sensing signal in dependence upon said sensing;
   a microcomputer for generating control signals to drive a motor for driving a platen drum at a normal speed and at a second speed higher than the normal speed and to temporarily stop to facilitate transition from said higher speed to said normal speed, according to the sensing signal;

means for controlling the motor to conform initialization of the position of multi-color printing according to the control signals of said microcomputer and the sensing signal from said sensing means; and
means for driving said motor according to the control signals from said controlling means.

2. The apparatus as claim 1, wherein said controlling means comprises:
a first buffer for buffering the output of said amplifying means;
a first transistor for receiving the sensing signal of said sensing means to block the power supply to said driving means so as to stop said motor, the collector of said first transistor being connected to the power supply terminal of said driving means and the base thereof to the output of said first buffer;
a second buffer for buffering a normal speed control signal of a plurality of said control signals output by said microcomputer; and
a second transistor for receiving the normal speed control signal of said microcomputer to supply said driving means with power, the base of said second transistor being connected to the output of said first buffer and the collector of said second transistor being connected to the power supplying terminal of said driving means.

3. The apparatus as claimed in claim 1, wherein said means for sensing the printing medium is a photo-coupler.

4. In a process for sequentially printing multi-color video signals using a platen drum, a motor for driving said platen drum, a driver for driving said motor, a sensor for sensing a printing paper and a microcomputer for controlling the speed of said motor according to the output of said sensor, a method for controlling the printing position of said video printer, comprising the steps of:
generating a sensing signal by sensing a printing medium;
generating control signals to drive a motor driving a platen drum at a normal speed and at a second speed greater than the normal speed and to control the speed to facilitate transition from said second speed to said normal speed, according to the sensing signal;
controlling speed of said motor to conform initialization of a position of multi-color printing according to the control signal and said sensing signal; and
driving said motor according to the control signal.

5. In a printer for sequentially printing color images in color on a printing medium in dependence upon video signals, an apparatus for controlling the printing position of the printer, comprising:
means for sensing the presence of a printing medium, and for providing sensing signals having a characteristic depending upon said sensing;
means for generating a plurality of control signals to drive a motor for driving a platen drum at a first speed and at a second speed greater than the first speed and to control speed to facilitate transition from said second speed to said first speed, in dependence upon said sensing signals;
means for controlling power to the motor to conform initialization of a position of multi-color printing on a printing medium according to the control signals and the sensing signals; and
means for driving the motor according to the control signals.

6. The apparatus as claimed in claim 5, wherein said controlling means comprises:
a first transistor having a base connectable to respond to the sensing signal by controlling application of power to said driving means, and a collector-emitter path of said first transistor connected between a power source and said driving means; and
a second transistor having a base connectable to respond to one control signal from among said plurality of control signals by controlling application of the power to said driving means, and a collector-emitter path of said second transistor connected between said power source and said driving means.

7. The apparatus as claimed in claim 5, wherein said controlling means comprises:
first means for buffering the output of said amplifying means;
a first transistor having a base connectable to receive the sensing signal to control application of power to said driving means, and a collector-emitter path of said first transistor being connected between a power source and said driving means;
second means for buffering one control signal from among said plurality of control signals; and
a second transistor having a base connectable to receive the one control signal to control application of the power to said driving means, and a collector-emitter path of said second transistor being connected between said power source and said driving means.

8. An apparatus for sensing and controlling the printing position of the printing medium of a video printer, comprising:
means for sensing the presence of a printing medium and providing output signals having a characteristic depending upon said sensing;
means for generating control signals to control the speed of a platen at a predetermined printing speed, and at a second speed higher than the printing speed to move the printing medium to a next printing position, and to control the speed of the platen to facilitate a transition from said second speed to said printing speed in dependence upon said output signals;
means exhibiting control conditions varying in dependence upon said output signals and said control signals, for controlling the platen to adjust an initial multi-color printing position on the printing medium; and
means for driving the platen according to said control signals and said control conditions.

9. The apparatus of claim 8, wherein said sensing means is comprised of a photo-coupler comprising of a light-emitting-diode and a photo-transistor.

10. The apparatus of claim 8, wherein said means for generating control signals comprises means for selecting one of a predetermined normal speed for accommodating a printing function, twice said normal speed for accommodating a non-printing function, and a temporary stop for preparation before printing.

11. The apparatus of claim 10, wherein said controlling means comprises means for equalizing a control speed error occurring between said providing of said sensing signals and said selecting of a predetermined speed is selected.

12. An apparatus for controlling the printing position of a printer, comprising:
  means for sensing the presence of a printing medium, and for providing sensing signals having a characteristic depending upon said sensing;
  means for generating a plurality of control signals to drive a motor for driving a platen drum at a first speed and at a second speed greater than the first speed and to control speed to facilitate transition from said second speed to said first speed, in dependence upon output of said sensing signals;
  means for providing control conditions to conform initialization of a position of multi-color printing on a printing medium in dependence upon the control signals and the sensing signals; and
  means for controlling positioning the printing medium according to the control signals and said control conditions.

13. The apparatus as claimed in claim 12, wherein said means for providing said control states comprises:
  a first switch having a control electrode connectable to respond to the sensing signal to block application of power to said controlling means, and a principal conduction path connectable between a power source and said controlling means; and
  a second switch having a control electrode connectable to respond to one control signal from among said plurality of control signals to supply said controlling means with said power, and a principal conduction path connectable between said power source and said controlling means.

14. The apparatus of claim 12, wherein:
  said sensing means provides a first output upon said sensing of the presence of a printing medium and provides a second output in the absence of said sensing of the presence of a printing medium; and
  said means for generating said control signals varies said control signals from a first state to a second state in response to said first output.

15. The apparatus of claim 12, further comprised of said means for providing said control conditions interrupting application of power to said controlling means in response to said first output.

16. The apparatus of claim 14, further comprised of said means for providing control conditions:
  enabling application of power to said controlling means in response to said first output;
  interrupting application of power to said controlling means in response to said second output; and
  enabling application of power to said controlling means in response to said second state.

17. The apparatus of claim 14, further comprised of said means for providing control conditions:
  enables said positioning in response to said first output;
  interrupts said positioning in response to said second output; and enables said positioning in response to said second state.

18. The apparatus of claim 8, wherein:
  said sensing means provides a first output upon said sensing of the presence of a printing medium and provides a second output in the absence of said sensing of the presence of a printing medium; and
  said means for generating said control signals varies said control signals from a first state to a second state in response to said first output.

19. The apparatus of claim 8, further comprised of said means for controlling the platen interrupts application of power to said driving means in response to said first output.

20. The apparatus of claim 18, further comprised of said controlling means:
  enables said driving of the platen in response to said first output;
  interrupts said driving of the platen in response to said second output; and
  enables said driving of the platen in response to said second state.

* * * * *

UNITED STATES PATENT AND TRADEMARK OFFICE
CERTIFICATE OF CORRECTION

PATENT NO. : 5,129,047
DATED : 7 July 1992
INVENTOR(S) : Dong-Il Cha

It is certified that error appears in the above-indentified patent and that said Letters Patent is hereby corrected as shown below:

Column 1,

Line 24    Change "paten" to --platen--;

Line 37    Change "theraml" to --thermal--;

Line 42    Delete "i.e.", Insert --i.e.. before "one";

Column 2,

Line 11    Change "comonents" to --components--;

Line 48    Change "smae" to --same--:

Signed and Sealed this

Tenth Day of December, 1996

Attest:

BRUCE LEHMAN

*Attesting Officer*    *Commissioner of Patents and Trademarks*